Feb. 27, 1951 W. A. EATON 2,543,099
FLUID PRESSURE VALVE
Filed May 14, 1947
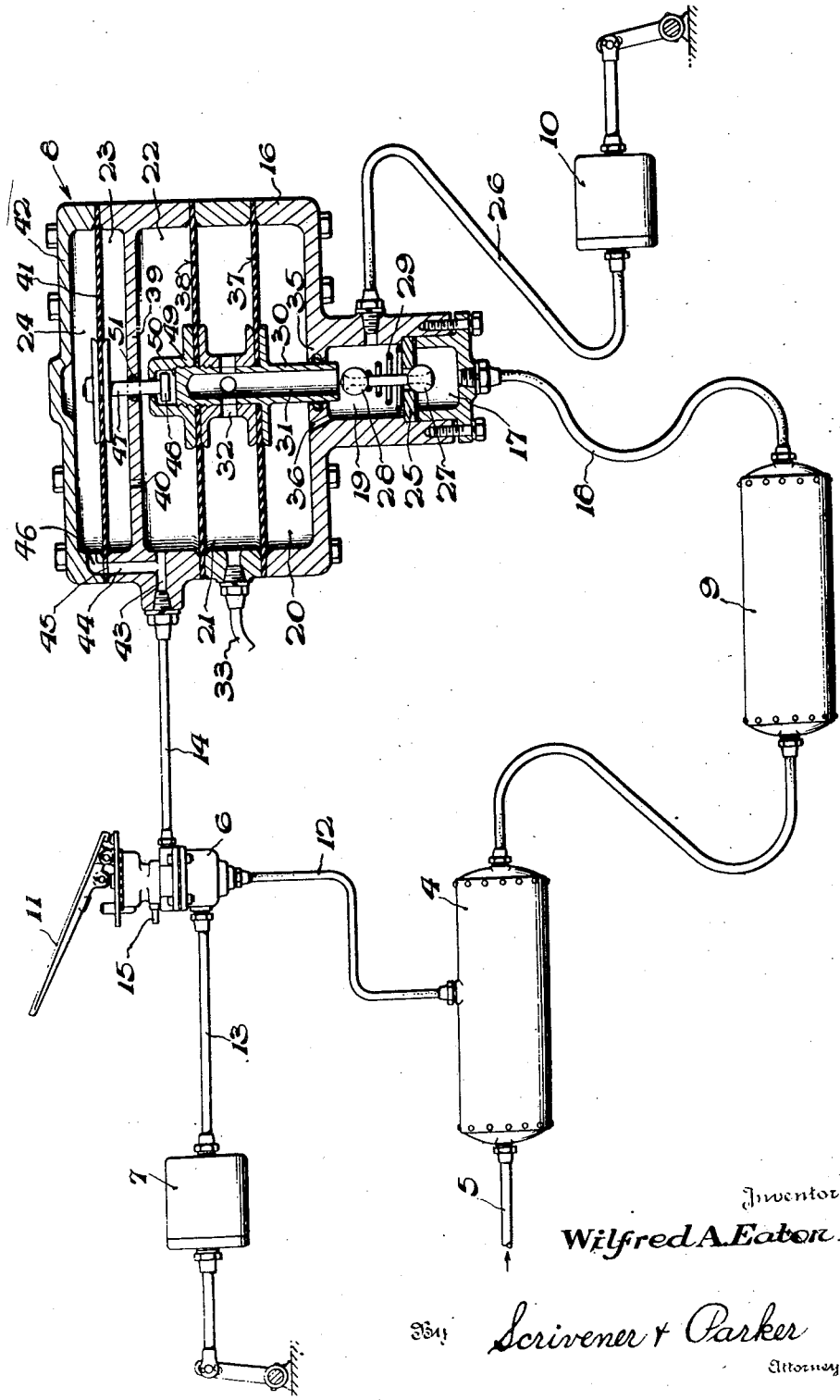
Inventor
Wilfred A. Eaton.
Scrivener & Parker
Attorneys Patented Feb. 27, 1951

2,543,099

UNITED STATES PATENT OFFICE 2,543,099

FLUID PRESSURE VALVE

Wilfred A. Eaton, Oakville, Conn., assignor to Bendix-Westinghouse Automotive Air Brake Company, Elyria, Ohio, a corporation of Delaware Application May 14, 1947, Serial No. 748,075

13 Claims. (Cl. 303—59)

This invention relates to control mechanisms, and more particularly to a remotely controlled fluid pressure operated valve mechanism especially adaptable for use in connection with motor vehicles.

It has heretofore been proposed to employ power operated mechanisms for operating the brakes or other controlled devices of an automotive vehicle, but in many cases, and particularly where fluid pressure has been utilized to effect remote control of such devices, there has been some time lag or delay in the application of the brakes after the operator has operated the corresponding control element to initiate such an application, and it is accordingly one of the objects of the present invention to provide means for overcoming this difficulty.

Another object of the invention is to provide in a fluid pressure controlled system for brakes, control valve means so constituted as to effect an extremely rapid application of the brakes.

Yet another object of the invention is to provide means of the above type, so consituted as to provide an improved sensitivity of control in the operation of the system.

Still another object of the invention is to provide relay valve mechanism located adjacent the brake actuator or other actuator, so constituted as to supply fluid pressure to the actuator with a minimum amount of time lag or delay.

These and other objects of the invention will be more fully understood in the light of the accompanying drawing and the following description. It is to be expressly understood, however, that the drawing is employed for purposes of illustration only, and is not designed as a definition of the limits of the invention, reference being had for this purpose to the appended claims.

In the drawing, the invention is shown as applied to a fluid pressure operated brake system for an automotive vehicle, but it will be understood that the invention is not so limited but may be employed for the operation of other types of control systems or devices. As shown, the system comprises in general, a supply reservoir 4 adapted to be supplied with fluid pressure such as compressed air, from a compressor, not shown, through a conduit 5, a brake valve 6 being adapted to supply fluid pressure to a front brake actuator 7, and a relay valve 8 being adapted to be controlled by the operation of the brake valve 6 for supplying fluid pressure from an auxiliary supply reservoir 9 to a rear brake actuator 10. The brake valve 6 is provided with an operating pedal 11, and is connected with the reservoir 4 by means of a conduit 12, with the actuator 7 by means of a conduit 13, and with the relay valve 8 by means of the conduit 14. The brake valve is of conventional type and may be similar to that disclosed in the patent to William J. Andres and Roy S. Sanford, No. 2,133,275, dated October 18, 1938. It will be understood that with such type of valve, when the brake pedal is in released position as shown, the valve will serve to prevent communication between conduit 12 and conduits 13 and 14, and will be effective to exhaust fluid pressure to atmosphere from the latter conduits through an exhaust outlet 15 in the brake valve.

The relay valve 8, of the self lapping type, is provided with a casing 16 having an inlet chamber 17 connected with the auxiliary reservoir 9 by means of a conduit 18, an outlet chamber 19, a diaphragm chamber 20, an exhaust chamber 21, a main or lower control chamber 22, an upper diaphragm chamber 23, and a supplemental or upper control chamber 24. A ported partition 25 is interposed between the inlet chamber 17 and the outlet chamber 19, and the latter chamber is connected with the actuator 10 by means of a conduit 26. A pair of interconnected inlet and exhaust valves 27 and 28 are positioned as shown, by means of an inlet valve spring 29, and a valve operating element 30, slidably mounted in the casing, and provided with a bore 31, open at its lower end, and connected with the exhaust chamber 21 by means of ports 32, is adapted on downward movement from the position shown to engage the exhaust valve 28 and move the valve assembly downwardly in order to permit communication between the inlet and outlet chambers 17 and 19 through the ported partition. With this construction, it will be understood that with the parts in the position shown, communication is prevented between the inlet chamber 17 and the outlet chamber 19, and is permitted between the outlet chamber and atmosphere through the bore 31, the ports 32, the exhaust chamber 21, and an exhaust connection 33 connected with the exhaust chamber. On downward movement of the valve operating element 30, communication between the outlet chamber and atmosphere is prevented due to the closing of the lower end of the bore 31 by the exhaust valve 28, and the inlet valve 27 is opened to permit communication between the inlet chamber and the actuator 10 through the ported partition 25, the outlet chamber 19 and the conduit 26. The relay valve mechanism 8 is preferably located closely adjacent the actuator 10 in order to permit the conduit 26 to be as short as possible, and the auxiliary reservoir 9 is likewise located closely adjacent the relay valve, and is supplied with fluid pressure from the reservoir 4 through a conduit 34 connected therebetween.

As shown in the drawing, the valve operating element 30 is slidably mounted in a partition 35 which serves to separate the outlet chamber 19 from the diaphragm chamber 20, and these chambers are connected at all times by means of a restricted passage 36. The exhaust chamber 21 is defined by the casing and by a pair of flexible diaphragms 37 and 38 clamped in the housing and clamped to the valve operating element in spaced relationship, the diaphragm 38 thus forming the lower wall of the control chamber 22. The upper end of the control chamber is defined by a partition 39 having a restricted port 40 therethrough, and the upper diaphragm chamber 23 is defined by the partition 39 and by a diaphragm 41 clamped between the upper end of the casing and a cover member 42 suitably attached to the casing. Thus the cover member and the diaphragm 41 serve to define the upper control chamber 24.

The conduit 14 is connected to a port 43 leading to the control chamber 22, and this port is in turn connected with the upper control chamber 24 through a passage 44 in the casing, a port 45 in the diaphragm 41, and a port 46 formed in the cover member. A downwardly extending valve operating stem 47 is clamped to the central portion of the diaphragm 41 as shown, and is provided at its lower end with an enlarged head portion 48. The upper end of the valve operating element 30 is provided with a cap or nut 49 having a bore at its upper end adapted to slidably receive the stem 47, and an enlarged bore 50 adapted to receive the enlarged head portion 48, the lower end of the latter bore being closed, as shown, by the upper end of the valve operatting element 30. The dimensions of the portion 48, the bore 50, and the valve operating element 30, are so chosen, that with all of the diaphragms in the position shown, a lost motion exists between the enlarged portion 48 and the upper end of the bore 50 in one direction, and between the portion 48 and the upper end of the valve operating element in the other direction. A suitable seal 51 carried by the partition 39 prevents the flow of fluid pressure between chambers 22 and 23 along the stem 47, the only communication between these chambers therefore being through the restricted passage 40.

Due to the above construction of the relay valve, it will be understood that on operation of the brake valve to supply fluid pressure to the control chamber 22, the diaphragm 38 will move the valve operating element 30 downward, operating the valves 27 and 28 to prevent communication between the outlet chamber 19 and atmosphere and to permit communication between the auxiliary reservoir 9 and the actuator 10 through the connections already described. It is well known to those skilled in the art that during such operation of self lapping valves, a sufficient pressure must be applied to the diaphragm 38 to overcome the force acting upwardly on the inlet valve 27 due to the pressure in inlet chamber 17, and that accordingly an appreciable pressure must be established in the control chamber 22 before the inlet valve can be opened to supply fluid pressure to the actuator in order to effect operation of the latter to apply the brakes. Some delay occurs in building up such pressure.

In addition to this delay, as soon as the inlet valve is opened, the pressure in the outlet chamber is transmitted to the diaphragm chamber 20 and the diaphragm 37 through the restricted passage 36, and that the action of this pressure upwardly on the diaphragm 37 tends to immediately initiate closing of the inlet valve, the speed with which this action occurs being dependent on the size of the valves and other parts, as well as on the size of the restricted passage 36. With the present construction, however, it will be understood that on application of fluid pressure to the control chamber 22, this pressure will likewise be transmitted to the chamber 24 and the upper diaphragm 41 through the relatively unrestricted passages 43, 44 and 45, and this pressure acting on the upper diaphragm will force the head portion 48 downwardly against the upper end of the valve operating element 30 in order to apply an additional force to the latter to open the inlet valve 27 against the pressure in the inlet chamber and at the same time to maintain the inlet valve in open position for a longer period of time against the force exerted upwardly by the diaphragm 37 due to the pressure supplied to the diaphragm chamber 20 through the passage 36.

In the event the above action were continued throughout the operation, it is apparent that the pressure maintained in the outlet chamber 19 by the relay valve mechanism would be substantially double that supplied to the chamber 22. Hence, in order to permit substantial equalizing of the pressures in the control chamber 22 and in the outlet chamber 19 when the relay valve mechanism is in lapped position, the restricted passage 40 is so chosen that during an increase in pressure in the control chamber 22, the pressure in the chamber 23 will appreciably lag behind the pressure in the chamber 22, the resulting pressure differential between the chambers 23 and 24 being the effective pressure acting downwardly on the diaphragm 41 to assist the diaphragm 38 in opening and maintaining the inlet valve in open position. As the pressure in the chamber 22 reaches that for which the brake valve 6 is adjusted by the operator at the moment, the pressure in the chamber 23 will eventually equal that in the chamber 22, and thereafter, the pressures on both sides of the diaphragm 41 will be equalized, and the diaphragm will be ineffective to operate the valve operating element in either direction.

On operation of the brake valve 6 to release fluid pressure from the control chamber 22 of the relay valve, the reverse action will take place, the chambers 24 and 22 being exhausted at substantially the same rate as the conduit 14, and the chamber 23 being exhausted at a slower rate due to the action of the restricted passage 40. In this case, the pressure in the chamber 23 is greater than that in the chamber 24, and the valve operating element will be urged upwardly to open the exhaust valve to its fullest extent by the pressure in the chamber 20 acting on the diaphragm 37, and by the pressure differential existing between the chambers 23 and 24. The latter pressure differential causes movement of the diaphragm 41, the valve stem 47 and the enlarged portion 48 upwardly, whereupon the latter will engage the upper end of the cap 49 in order to assist the diaphragm 37 in moving the valve operating element 30 upwardly to fully open the exhaust valve in order to effect an extremely rapid release of fluid pressure from the actuator 10.

In the operation of valves of this type, it is essential that the valve operating element 30 be free to move in response to slight variations of pressure in the chambers 22 and 20 in order to control the operation of the valves 27 and 28 for the purpose of effecting small changes of pressure in the actuator 10. In order to prevent interference with this type of operation, the lost motion hereinafter referred to is incorporated between the head portion 48 of the valve stem 47 and the valve operating element 30, the result being that when the pressures are balanced in the chambers 23 and 24, the movement of the valve operating element is not retarded in any way by the stem 47 and the enlarged portion 46 thereof. The lost motion in either direction is so chosen as to permit normal operation of the valve operating element to effect small changes of pressure in the actuator 10 without interference from the action of the upper diaphragm 41 and its attached connecting mechanism. This is accomplished by equally dividing the lost motion in both directions when the valve is in lapped position. The diaphragm 41 is sufficiently flexible to permit this lost motion to be taken up on operation of the diaphragm without any appreciable decrease in the diaphragm efficiency.

In view of the foregoing description, it will be apparent that a relay valve structure has been provided, adapted to be located closely adjacent the actuator, and closely adjacent the auxiliary supply reservoir, so constituted that on initial operation of the brake valve to supply fluid pressure to the relay valve, the force available in the relay valve to open the inlet valve will be nearly twice as great as that available in relay valves of the present conventional type. This results in an almost instantaneous opening of the inlet valve of the relay valve in order to quickly supply fluid pressure to the brake actuator 10 with a minimum amount of delay. At the same time, the valve is so constituted as to permit this type of operation whenever the brake valve is operated to effect a large change in the pressure of fluid supplied to the relay valve, and the relay valve is further so constructed as to effect an extremely rapid and complete opening of the exhaust valve whenever any large reduction in pressure is made in the control conduit leading to the relay valve. At the same time, the auxiliary diaphragm 41 and its connections with the valve operating element 30 of the relay valve are so arranged as to present no interference whatsoever to the normal self-lapping action of the relay valve during operation of the latter to effect small changes of pressure in the fluid supplied to and released from the actuator 10.

Although the above relay valve has been described as being primarily useful in connection with the operation of fluid pressure brakes, it will be understood that a relay valve of this type will be equally effective in connection with the rapid application of fluid pressure to any type of actuator, and that it is particularly effective in installations wherein the master control valve or brake valve is situated at a considerable distance from the relay valve and actuator, as for example, in tractor and trailer installation.

While the invention has been illustrated and described herein with considerable particularity, it is to be understood that the same is not limited to the form shown, but may receive a variety of mechanical expressions as will readily appear to those skilled in the art. Reference will, therefore, be had to the appended claims for a definition of the limits of the invention.

What is claimed is:

1. The combination with a fluid pressure brake system having a main reservoir, an auxiliary reservoir, a fluid pressure brake actuator, and a fluid pressure operated relay valve including a movable valve operating element for controlling the flow of fluid pressure from the auxiliary reservoir to the brake actuator, of a brake valve connected with the main reservoir for supplying fluid pressure to the relay valve for controlling the operation thereof, and fluid pressure actuated means movable in response to fluid pressure from said brake valve for also controlling the operation of the relay valve, said fluid pressure actuated means including a diaphragm, a relatively unrestricted connection between the brake valve and one side of the diaphragm, a restricted connection between the other side of the diaphragm and the brake valve, and means operatively connecting the diaphragm and valve operating element.

2. The combination as set forth in claim 1 wherein the operative connection between the diaphragm and the valve operating element includes a lost motion connection.

3. A self-lapping relay valve having a casing provided with a valve device movable to exhaust, open and lapped positions to control the flow of fluid pressure, a pair of spaced-apart diaphragms within the casing and defining a control chamber, an exhaust chamber and a diaphragm chamber, means to conduct a controlling pressure to said control chamber to control the movements of said diaphragms, means connected with the diaphragms to control the movement of said valve device to said positions, a separate diaphragm operatively connected with said pair of diaphragms, means to subject one side of said separate diaphragm to said controlling pressure, and a partition between the other side of said separate diaphragm and said control chamber, said partition being provided with a restricted passageway.

4. A self-lapping relay valve having a casing provided with a valve device movable to exhaust, open and lapped positions to control the flow of fluid pressure, a pair of spaced-apart diaphragms within the casing and defining a control chamber, an exhaust chamber and a diaphragm chamber, means to conduct a controlling pressure to said control chamber to control the movements of said diaphragms, means connected with the diaphragms to control the movement of said valve device to said positions, a separate diaphragm operatively connected with said pair of diaphragms, and means including a ported partition between the separate diaphragm and the control chamber to subject said separate diaphragm to a pressure differential derived from said controlling pressure to speed up the movements of said pair of diaphragms, said connecting means, and said valve device.

5. A self-lapping relay valve as set forth in claim 4 wherein the operative connection between the separate diaphragm and the pair of diaphragms includes a lost motion connection.

6. A self-lapping relay valve having a casing provided with a valve device movable to exhaust, open and lapped positions to control the flow of fluid pressure, pressure responsive means including a diaphragm within the casing and defining a control chamber between the diaphragm and casing, means movable by said diaphragm for controlling the operation of the valve device, means to conduct a controlling pressure to said control chamber to control the movement of the diaphragm and movable means, a second diaphragm operatively connected with the first named diaphragm, means to subject said second diaphragm to said controlling pressure, and a ported partition between the second diaphragm and the control chamber.

7. A self-lapping relay valve having a casing provided with a valve device movable to exhaust, open and lapped positions to control the flow of fluid pressure, pressure responsive means including a diaphragm within the casing and defining a control chamber between the diaphragm and casing, means movable by said diaphragm for controlling the operation of the valve device, means to conduct a controlling pressure to said control chamber to control the movement of the diaphragm and movable means, a second diaphragm operatively connected with the first named diaphragm, and means including a ported partition between the second diaphragm and the control chamber to subject said second diaphragm to a pressure differential derived from said controlling pressure to speed up the movements of the first named diaphragm, movable means, and valve device.

8. A self-lapping relay valve as set forth in claim 7 wherein the operative connection between the diaphragms includes a lost motion connection.

9. A self-lapping relay valve having a casing provided with a valve device movable to exhaust, open and lapped positions to control the flow of fluid pressure, pressure responsive means within the casing movable in response to a controlling pressure for controlling the movement of said valve device to said positions, and means operatively connected with the pressure responsive means for speeding up the movements thereof, comprising a pressure responsive member within the casing and dividing the latter into a control chamber at one side of the member and a diaphragm chamber at the other side of the member, means including a relatively unrestricted connection for conducting the controlling pressure to the control chamber, and means including a restricted connection for conducting the controlling pressure to the diaphragm chamber.

10. A self-lapping relay valve as set forth in claim 9 wherein the operative connection between the pressure responsive means and the pressure responsive member includes a lost motion connection so constructed and arranged as to allow slight movements of the pressure responsive means independently of said pressure responsive member.

11. A self-lapping relay valve having a casing provided with a valve device movable to exhaust, open and lapped positions to control the flow of fluid pressure, pressure responsive means within the casing and including a diaphragm movable in response to a controlling pressure for controlling the movement of said valve device to said positions, and means operatively connected with the pressure responsive means for speeding up the movements thereof, comprising a second diaphragm within the casing and forming with the latter a supplemental control chamber at one side of the second diaphragm, a partition between the diaphragms forming a diaphragm chamber at the other side of the second diaphragm and a main control chamber at one side of the first diaphragm, means to connect the main control chamber with the supplemental control chamber, and means comprising a port in the partition to connect the main control chamber with the diaphragm chamber.

12. A self-lapping relay valve having a casing provided with a valve device movable to exhaust, open and lapped positions to control the flow of fluid pressure, pressure responsive means within the casing and including a diaphragm movable in response to a controlling pressure for controlling the movement of said valve device to said positions, and means operatively connected with the pressure responsive means for speeding up the movements thereof, comprising a second diaphragm within the casing, a partition between the diaphragms, and a pair of connections for conducting the controlling pressure to opposite sides of the second diaphragm, at least one of said connections being provided with a restriction.

13. A self-lapping relay valve as set forth in claim 12 wherein the operative connection includes a lost motion device.

WILFRED A. EATON.

REFERENCES CITED

The following references are of record in the file of this patent:

UNITED STATES PATENTS

| Number | Name | Date |
|---|---|---|
| 2,088,185 | Borde | July 27, 1937 |